Patented Oct. 13, 1936

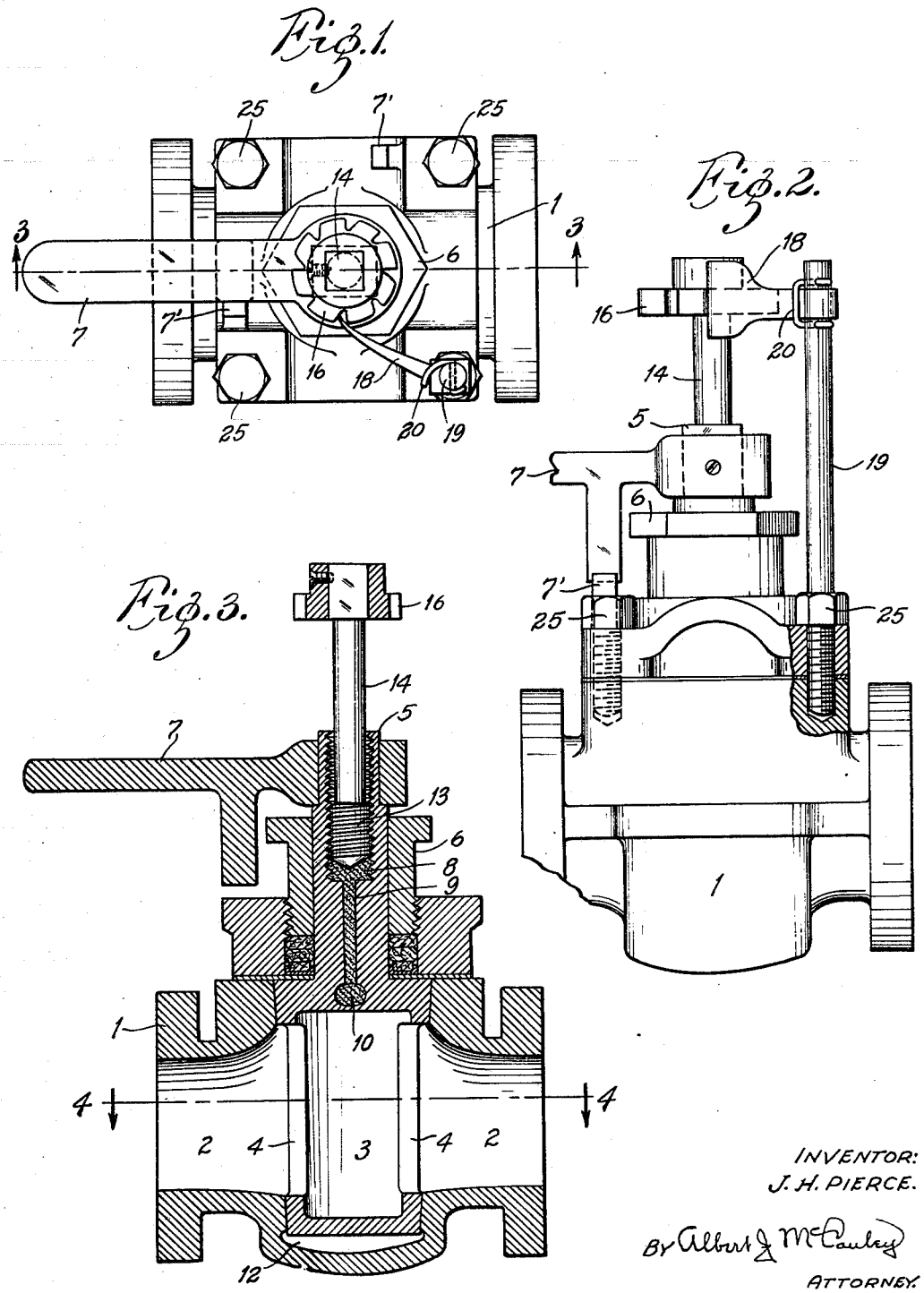

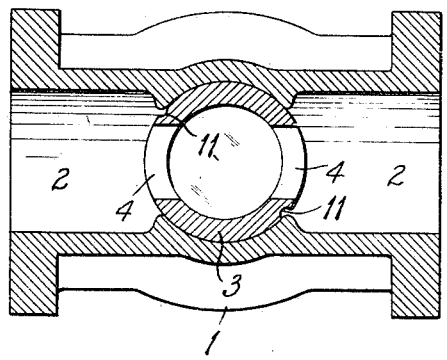
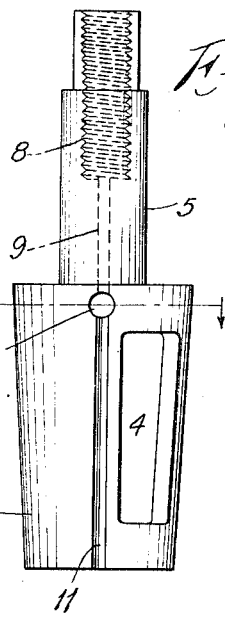
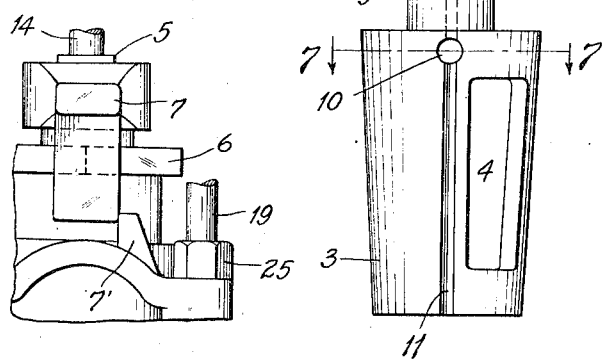
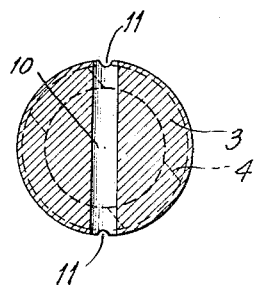

2,057,343

UNITED STATES PATENT OFFICE 2,057,343

VALVE-LUBRICATING DEVICE

Joseph Hubert Pierce, Tulsa, Okla.

Application May 2, 1932, Serial No. 608,581

4 Claims. (Cl. 251—93)

This invention relates to valve-lubricating devices, and more specifically it relates to an attachment whereby lubricant is automatically transmitted to a valve seat while the valve is in motion.

Some types of valves should be lubricated at more or less frequent intervals to prevent undue friction at their seats, and if not properly lubricated they will have a relatively short life of service, will stick, become scored, leak, and provide a very uncertain and inaccurate regulation of the flow through the valve devices.

Prior to this invention, it has been proposed to lubricate such valves. However, in so far as I am aware, there has not been a complete and satisfactory solution of the problem.

To insure a satisfactory operation of the valve it should be lubricated at intervals during the operation of the valve to provide a thorough distribution of the lubricant over the valve seat.

In the old lubricating devices for valves of this kind, the valve member usually is lubricated by screwing a plug into a lubricant chamber whenever the operator decides that it is necessary to lubricate the valve. It is difficult to operate these old lubricating devices while the valve member is in motion, and under some conditions this would be almost impossible. As a result the valve is usually lubricated when the valve member is stationary, and a thorough distribution of the lubricant is not obtained.

Moreover, since these old lubricating devices require special hand operations to lubricate the valves, the operators frequently forget to use the old lubricators, and in many cases they are not actually operated after the valve is placed in service.

An object of this invention, therefore, is to provide a valve-lubricating device which is actuated by the usual operating member or handle of the valve, so as to insure a thorough lubrication of the valve when it is in service.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Briefly stated, this invention relates to a self-lubricating valve which may comprise a valve housing, a valve member adapted to occupy an open and closed position in the valve housing, an operating member whereby the valve member may be opened and closed, a lubricant chamber in communication with the valve member, a pressure member in the lubricant chamber, and means whereby power is transmitted from the operating member to the pressure member to supply lubricant to the valve member.

As a specific illustration of my invention, I will hereafter describe one form thereof as applied to a plug type valve, such as shown in the drawings.

Fig. 1 is a top view of a valve provided with a lubricating device embodying the features of this invention.

Fig. 2 is a side elevation thereof, with a portion of the valve housing broken away.

Fig. 3 is a section on the line 3—3 in Fig. 1.

Fig. 4 is a section on the line 4—4 in Fig. 3.

Fig. 5 is a fragmentary view showing the valve-operating member.

Fig. 6 is a detail view of the valve member.

Fig. 7 is a section on the line 7—7 in Fig. 6.

1 designates a valve housing having inlet and discharge ports 2. A tapered plug valve member 3 having a passageway 4 is fitted to a correspondingly tapered seat in the housing 1. The valve member 3 may be provided with an operating stem 5 extending through a stuffing box including a gland 6 and packing below the gland, as shown in Fig. 3.

The operating stem 5 may have a non-circular upper end to receive a wrench or other suitable handle 7 to operate the valve member 3, said handle having a depending lug adapted to engage stop lugs 7' which limit the motion of the valve.

To illustrate one form of the invention, I have shown a lubricant chamber 8 in the valve stem 5 (Fig. 3), a vertical passageway 9 extending downwardly from said chamber to a transverse passageway 10 which extends across the valve member 3, and lubricant grooves 11 communicating with the ends of said transverse passageway 10. The grooves 11 are formed in the periphery of the valve member and they extend downwardly to the bottom of said valve member (Fig. 6) so as to communicate with a chamber 12 (Fig. 3) below said valve member.

The lubricant chamber 8 is threaded to receive the threaded end 13 of a pressure member 14. The pressure member 14 may be provided with a ratchet wheel 16 as shown in Figs. 1, 2, and 3. A pawl 18 is pivotally secured to a rod 19 and held in yielding engagement with the ratchet wheel 16 by means of a spring 20.

The pawl 18 will permit the pressure member 14 to turn with the operating stem 5 when said stem is turned in one direction to close the valve member 3, but the pawl 18 will prevent rotation of the pressure member 14 when the operating member is turned in the opposite direction to open the valve member 3.

Therefore, when the operating member is actuated to move the valve member 3 to an open position, the threaded portion of lubricant chamber 8 will cooperate with the threaded end of the pressure member 14 to force the pressure member further into the lubricant chamber and thus force the lubricant through the passageways 9, 10, and 11, and onto the surface of the valve member 3.

When the valve-operating member is turned in the opposite direction to close the valve, the pawl allows the pressure member and ratchet wheel to idly turn with the operating member, and the pressure member is not moved into lubricant chamber to discharge the lubricant therefrom.

The valve member 3 is, therefore, lubricated every time it is moved to an open position, and no extra operation is necessary to supply lubricant to the valve member.

The operator merely has to fill the lubricant chamber from time to time, and the valve lubricating device will positively insure a proper lubricating of the valve member thereafter.

When the lubricant has become exhausted from the lubricant chamber, the pressure member 14 will strike the bottom of the lubricant chamber and the pawl will prevent further opening of valve. The operator is thus warned that an additional supply of lubricant is required.

If in cases of emergency, after the lubricant has been exhausted, it is desired to open the valve member, the pawl 18 may be pulled away from the ratchet wheel so that the operating member may be rotated.

When the valve is open, as shown in Fig. 4, the lubricant passageways 11 are preferably open at points beyond the valve seat, so that any excess lubricant may be discharged into the valve housing, thereby relieving any excessive pressure that may occur in the lubricating system.

In the form of the invention herein disclosed, there are two different operating members, namely, the usual handle 7 which operates the valve, and the pressure member 14 to operate the lubricating system, and motion is transmitted from one of these members to the other, so as to operate and at the same time lubricate the valve. During this double operation, the handle 7 moves in an arcuate path while the pressure member 14 moves longitudinally in a straight line, with the result of transmitting lubricant to the valve seat while the valve is in motion.

The lubricant is thus distributed over the valve seat without any attention on the part of the operator, aside from the usual attention to a single valve-operating member.

The device herein shown can be conveniently attached to old valves having threaded lubricant chambers in their stems and screws 25 to secure the stuffing boxes. It is only necessary to substitute the pawl-carrying rod 19 for one of the screws 25, and to add the threaded pressure member 14 with its ratchet wheel 16. As shown by Fig. 2, the free edge of the pawl 18 is elongated to permit longitudinal motion of the pressure member 14. However, it is to be understood that the invention is not limited to the specific details of this attachment, and that other forms of the invention will suggest themselves to those skilled in the art, not only in the designing of new valves to receive the automatic lubricating device, but also in adapting the same for operation with old valve structures. The invention, therefore, extends to modifications within the scope of the following claims.

I claim:

1. A self lubricating valve comprising a valve housing having a valve seat, a valve member engaging said seat, an operating member comprising a stem extending from said valve member and movable in opposite directions to open and close said valve member, said operating member being provided with a lubricant chamber in communication with said valve seat, a pressure member having a threaded portion located in said lubricant chamber, said lubricant chamber having a threaded inner face adapted to engage the threaded portion of said pressure member, and means to prevent rotation of said pressure member when said operating member is moved in one of said directions so that the threaded inner face of the lubricant chamber will cooperate with the threaded portion of the pressure member to force said pressure member into the lubricant chamber.

2. A self lubricating valve comprising a valve housing having a valve seat, a valve member engaging said seat, an operating member rotatable in opposite directions to open and close said valve member, said operating member being provided with a lubricant chamber communicating with said valve seat, and a pressure member having a threaded portion located in said lubricant chamber, said lubricant chamber being provided with a threaded face adapted to engage the threaded portion of said pressure member, said pressure member being free to rotate with said lubricant chamber and operating member when said operating member is turned in one of said directions, and means to prevent rotation of said pressure member when the operating member is turned in the other of said directions, so that the threaded face of said lubricant chamber will cooperate with the threaded portion of the pressure member to force the pressure member into said lubricant chamber.

3. A self lubricating valve comprising a valve housing provided with a valve seat, a valve member engaging said seat, an operating member rotatable in opposite directions to open and close said valve member, said operating member being provided with a lubricant chamber having a discharge passageway communicating with said valve seat, a pressure member having a threaded portion located in said lubricant chamber, said pressure member being provided with a ratchet wheel, and a pawl engaging said ratchet wheel to prevent rotation of the ratchet wheel and pressure member when said operating member is moved to open said valve member, said pawl and ratchet wheel being arranged to permit rotation of the pressure member when said operating member is moved to close said valve member, said lubricant chamber being provided with a threaded face engaging the threaded portion of said pressure member, so that the pressure member is advanced into the lubricant chamber when the operating member is moved to open said valve member.

4. A self lubricating valve comprising a valve housing provided with a valve seat and inlet and outlet ports, a rotatable tapered plug valve member engaging said seat and provided with lubricant passageways adapted to communicate with said ports when the valve member occupies an open position, an operating stem extending from said valve member to a position outside of said housing, said operating stem being provided with a lubricant chamber communicating with said lubricant passageways, a pressure member having a threaded portion located in said lubricant chamber, said pressure member being provided with a ratchet wheel, and a pawl engaging said ratchet wheel to prevent rotation of the ratchet wheel and pressure member when said operating member is moved to open said valve member, said ratchet wheel and pawl being arranged to permit rotation of the pressure member with the operating member when said operating member is moved to close said valve member, and said lubricant chamber being provided with a threaded portion adapted to engage the threaded portion of said pressure member so that said pressure member is advanced into said lubricant chamber when said operating member is moved to open said valve member.

JOSEPH HUBERT PIERCE.